United States Patent
Nissinen et al.

(10) Patent No.: US 7,022,185 B2
(45) Date of Patent: Apr. 4, 2006

(54) APPARATUS FOR TREATING A WEB OF PAPER OR PAPERBOARD

(75) Inventors: Vilho Nissinen, Numminen (FI); Juha Leimu, Turku (FI); Rauno Rantanen, Muurame (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/472,106

(22) PCT Filed: Mar. 13, 2002

(86) PCT No.: PCT/FI02/00203

§ 371 (c)(1),
(2), (4) Date: Nov. 18, 2003

(87) PCT Pub. No.: WO02/072953

PCT Pub. Date: Sep. 19, 2002

(65) Prior Publication Data

US 2004/0074440 A1     Apr. 22, 2004

(30) Foreign Application Priority Data

Mar. 13, 2001 (FI) .................................. 20010504

(51) Int. Cl.
*B05C 5/00* (2006.01)
*B05B 1/28* (2006.01)
*B05B 15/04* (2006.01)

(52) U.S. Cl. .................. 118/325; 118/326; 118/314; 118/302

(58) Field of Classification Search ................ 118/325, 118/302, 304, 314–316, 234, 326
See application file for complete search history.

(56) References Cited

U.S. PATENT DOCUMENTS

| 4,944,960 | A | 7/1990 | Sundholm et al. |
| 6,063,449 | A | 5/2000 | Koskinen et al. |
| 6,106,902 | A | 8/2000 | Koskinen et al. |
| 6,309,463 | B1 * | 10/2001 | Hess et al. .................. 118/302 |

FOREIGN PATENT DOCUMENTS

| EP | 0 690 171 A2 | 1/1996 |
| WO | WO 92/12803 | 8/1992 |
| WO | WO 99/15731 | 4/1999 |

* cited by examiner

*Primary Examiner*—Chris Fiorilla
*Assistant Examiner*—Yewebdar Tadesse
(74) *Attorney, Agent, or Firm*—Cohen, Pontani, Lieberman & Pavane (57) ABSTRACT

An assembly is disclosed treating a moving web (1) of paper or paperboard with a web treatment substance, the assembly comprising an application chamber (P2) located in a close vicinity of the moving web (1) and facing the web (1), whereby the chamber is delineated by the web (1), the walls (12) of the coater apparatus and sealing means (18, 24, 35) adapted to operate at the web ingoing and outgoing sides of the application chamber (P2). For application of the web treatment substance, the assembly includes at least one linear nozzle array incorporating at least one nozzle (21) for spraying the web treatment substance onto the web (1). The coater apparatus is divided into chambers so that a suction chamber (P3) is located behind the application chamber (P2) as seen from the direction of the web (1) and is adapted to communicate with application chamber (P2), and a flow is established into the suction chamber (P3) and the application chamber (P2) for removing mist and accumulations of the web treatment substance in such a manner that the pressure of the application chamber (P2) is made lower than the ambient pressure and the pressure of the suction chamber (P3) lower than that of the application chamber. In the assembly, the free flow direction of substances contained in the assembly is firstly from the surroundings into the application chamber (P2) and then from the application chamber (P2) to the suction chamber (P3) and means (22) serving to establish the flow.

19 Claims, 7 Drawing Sheets

APPARATUS FOR TREATING A WEB OF PAPER OR PAPERBOARD

PRIORITY CLAIM

This is a U.S. national stage of PCT application No. PCT/FI02/00203, filed on Mar. 13, 2002. Priority is claimed on that application and on Application No. 20010504, filed in Finland on Mar. 13, 2001.

BACKGROUND OF THE INVENTION

The invention relates to an apparatus for applying a web treatment substance to the surface of a moving web of paper or paperboard by means of spray nozzles.

Currently, application of coating to a web of paper and paperboard is carried out using a plurality of different methods. Each application method has certain characteristic features that affect the quality of the finished product and its manufacturing process. In regard to the optimal production process, the choice must be made based on the actual running speed and strength of the web. The qualities to be rendered to the finished product are determined by the end use of the product, which in practice is defined by the printing method applied to the product and the intended degree of quality to be rendered to the final printed surface. In general, good printability can be achieved by giving the web a sufficiently smooth and even surface having an extremely high brightness. These qualities can be attained by applying a sufficient number of coating layers to the web being processed and then calendering the same in the different phases of paper manufacture. Obviously, as a high number of treatment steps increase the end price of the product, it must be understood that the choice of the proper manufacturing technique is ultimately dictated by the qualities that are desired from the end product. After the suitable process for the desired end product is chosen, it is possible to select such a finishing technique that renders the optimum result in terms of production efficiency and end product quality.

One promising application method is the spray-coating technique, wherein the coating furnish or other web treatment material is applied to the surface of a paper or paperboard web by means of high-pressure spray nozzles. In this method, the web treatment material is pressurized to a high pressure and then sprayed from a small-orifice spray nozzle at a high velocity onto the web. A benefit of the method is that it imposes minimal stress on the web resulting in a good runnability behavior of the spray-coating apparatuses. As it is implemented in a fully noncontacting fashion, this kind of application excels over conventional blade and film-transfer techniques by being more gentle and less stressing to the web thus facilitating a production efficiency increase of about 5% as compared with blade application. In a different point of view, this allows the web to be produced from a stock of weaker strength, which is a particular benefit in making paper from recycle fiber. Contacting application methods such as blade coating or film-transfer coating always need between the web surface and the excess-coating-doctoring element a gap that determines the thickness of the applied coat. Due to this and other factors, the final coat weight is affected by quality variations in the base sheet, among other things by its profile deviations and surface roughness. In contrast, a spray-coater applies to the web under all circumstances a coating layer of constant weight entirely unaffected by base sheet quality variations. Moreover, spray-coating can be performed to a base sheet whose moisture content is higher and, hence, whose strength is lower than what has been acceptable earlier.

Since the coating mixture, surface size or other web treatment substance is applied in the spray-coating technique to the web surface in the form of a droplet shower that flies in a free space the travel from the nozzle tip to the web being treated, a practicable implementation of the system is complicated by the tendency of the coating mist to escape to the surrounding atmosphere. Therefore, the spray nozzles must be enclosed by a hood. In the hood the coating mixture mist condenses on all surfaces wherefrom it must be recovered so that large drops of the condensate are stopped from reaching the web surface. Furthermore, the condensed coating mixture must be prevented from access to the coating spray. While all application methods are hampered by the entry of the air boundary layer traveling along with the moving web to the application zone, this problem appear particularly accentuated in a spray-coater, because the spray of the web treatment substance must penetrate through the air boundary layer by virtue of its kinetic energy alone. Due to the minute size of the coating mixture droplets, also their kinetic energy remains quite small even at a high initial velocity of the sprayed droplets.

Various kinds of assemblies for collecting aerosol mists are known from, e.g., the art of spray-painting arrangements. Since these assemblies are designed, however, for handling unit articles, they permit paint application to be carried out in an entirely closed space or, alternatively, the materials to be treated are so durable and travel at such a slow speed that the space of active treatment of articles can be readily isolated from the surrounding space. These painting or, more broadly, surface treatment systems are used for surface treatment of sheet metal, for instance. In contrast, the web speeds today used in papermaking machines are so high that the air boundary layer traveling along with the web has grown to be an extremely powerful factor of disturbance. Furthermore, the trend is to run as thin base webs as possible made from low-strength fiber in order to cut down the product price. This results in a conflicting situation, wherein the flow of the air boundary layer at the critical areas of the web surface needs to be prevented by effective means but, however, the moving web itself cannot take a robust mechanical contact, for instance.

In U.S. Pat. Nos. 6,106,902 and 6,063,449 are disclosed some techniques for collecting coating mist in spray-coater apparatuses and sealing the applicator chamber. Among these methods deserve to be mentioned, e.g., running the applicator chamber under a vacuum, the use of steam or air flow for controlling the travel of the coating mixture mist and the formation of a film of the web treatment substance flowing along the walls of the applicator chamber.

SUMMARY OF THE INVENTION

It is an object of the present invention to provide an assembly suited for controlling the applicator chamber flows of gases, solids-containing fluid and coating mist so that the coating process can be carried out undisturbed and the coating mix can be prevented from escaping to the surrounding environment.

The goal of the invention is achieved by way of dividing the coater apparatus into at least two chambers which are separated from the surrounding environment so that one of the chambers is adapted to face the surface of the moving web being treated while the other chamber is located on the opposite side of the web, whereby the pressures in these chambers are adjusted so that the pressure in the chamber closest to the web surface being treated is lower than the ambient pressure and the pressure in the chamber located behind the application chamber as seen from the direction of the web is lower than the pressure in the application chamber.

According to a preferred embodiment of the invention, the coating mist formed in the interior of the application chamber, as well as the excess flowable web treatment substance are removed from the application chamber via one and the same path.

The invention offers significant benefits.

The invention makes it possible to control the flow of a fluid web treatment substance, the mist generated therefrom and air flows in an application chamber so that there is no risk of the deterioration of the coated or otherwise treated web surface or of the coating mist escaping to the surrounding environment. All the material components existing in the different phases of state in the application chamber are collected away via one and the same path thus making the handling of the different material components effective. The mist of web treatment substance is separated from the air removed by suction from the application chamber and is recirculated, together with the curtain flow of the substance collected from the walls of the chamber, back to the circulation of the web treatment substance.

BRIEF DESCRIPTION OF THE DRAWINGS

In the following, the invention will be examined in greater detail by making reference to the appended drawings in which.

DETAILED DESCRIPTION OF THE PRESENTLY PREFERRED EMBODIMENTS

Figure 1:
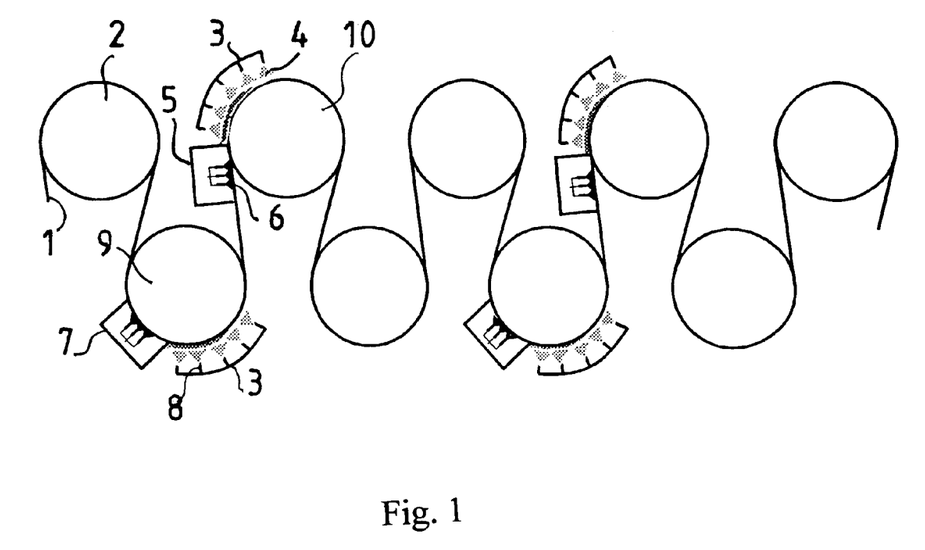
FIG. 1 shows a coater arrangement utilizing a spray-coater assembly according to the invention.

Referring to FIG. 1, therein is shown a coater arrangement suited for utilizing an assembly according to the invention for applying a web treatment substance to the surface of a moving web. The invention may be readily adapted to a plurality of treatment systems, whereby the present exemplary embodiment only serves to elucidate a typical application environment of the invention.

In the assembly of FIG. 1, a spray-coater is arranged to operate in conjunction with a dryer cylinder group, wherein a web 1 passes over cylinders 2 so that the side of the web facing a dryer cylinder 2 changes in an alternating fashion. The arrangement shown in FIG. 1 may be considered to illustrate a portion of a dryer cylinder group or even the entire group. In principle, the assembly can be implemented by locating the applicator units at any point of the cylinder group assembly. Obviously, the number of cylinders needed herein is dependent on the required drying capacity. In this diagram, the web 1 is passed onto the first cylinder 2, and a spray-coater unit 7 is adapted to operate in conjunction with the next cylinder 9. The coater unit 7 comprises a hood 5 with spray nozzles 6 located therein. Application takes place by feeding a web treatment substance at a high pressure, e.g., about 80 to 180 bar, into spray nozzles 6, whereby the treatment agent at exit from a nozzle of a small diameter of about 0.25 to 0.4 mm attains a velocity of about 100 m/s, is atomized into droplets and spreads as a fan-shaped spray of a given opening angle determined by the design of the spray nozzle. The fine-atomized coating mist hits the surface of the passing web. The nozzles may be placed over the cross-machine width of the web at 50 to 70 mm distance between each other into a single linear array or plural arrays, and the distance of the nozzles from the web is typically 10 to 100 mm.

Operating in conjunction with the coater unit 7 on the same cylinder 9 is adapted an ion-blast unit 3 comprising a plurality of pointed electrodes 8. A high-voltage field can be applied between the electrodes 8 and the cylinder 9, whereby the stream of ionized gas molecules leaving the electrode tips also ionizes the coating mist 4 possibly trying to escape from the hood 5 and then, with the help of the electric field, directs the mist to adhere to the surface of the web 1. This device serving to capture the stray coating mist may be constructed integral with the coater unit or, alternatively, be a separate device. Advantageously, however, the mist control device is located as close as possible to the coater unit 7. A coating mist control method and device based on the ion-blast technique is described in the applicant's European patent application EP 1 040 225.

Immediately after leaving the second cylinder 9, the web 1 passes to the next cylinder 10, whereby the outside of the web not facing the cylinder is reversed. This cylinder incorporates similar coater and coating mist control means as those described above for treating the other side of the web. After the second application phase, the web 1 passes over two dryer cylinders to the next application phase, wherein application takes place in the same fashion as in the first application phase. This embodiment is characterized in that a noncontacting dryer is not used for drying the coated side of the web after application, which means that the weight and quality of the applied coat must be selected such that the coating will dry and set sufficiently before the treated side of the web meets the dryer cylinder. Accordingly, this configuration is best suited for applying light-weight coats. It must be further noted that although application herein takes place in two phases, the process is not a genuine two-layer application, but rather, the application is divided to take place in two phases in order to provide sufficient drying of the web after application, whereby a smoother coat profile both in the machine and cross-machine directions is attained using plural application phases. However, with the provision that a sufficiently high drying capacity is available, the number of applications can be increased so as to make a two-layer coating, whereby different kinds of coating mixtures can be used in the successive applications. For instance, the first application can be made using surface size instead of coating.

Figure 2:
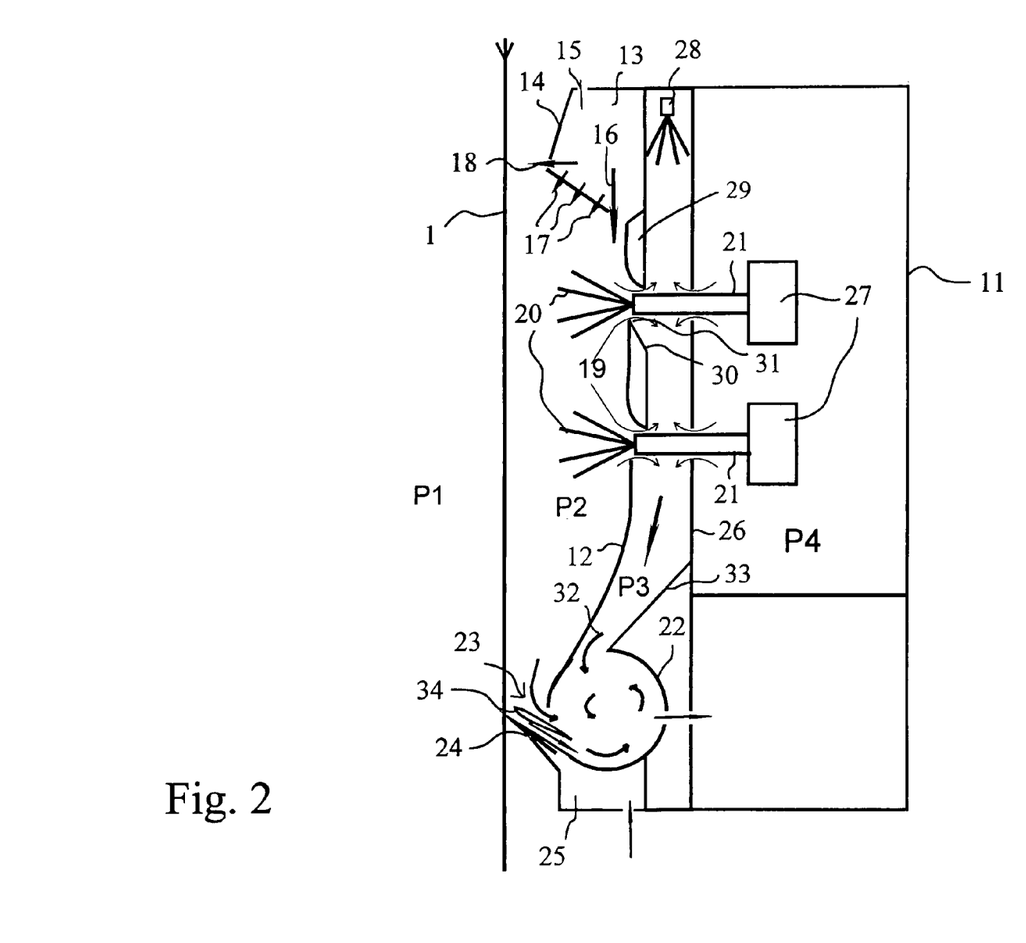
FIG. 2 shows a first embodiment of the invention.

In the assembly of FIG. 2, a coater according to the invention is shown operating about a web 1. The assembly is located in the interior of a hood 11 that isolates the components of the assembly from the surroundings. The open side of the hood 11 faces the moving web 1. The web 1 is arranged to run vertically. This orientation of web run is the easiest way to prevent the condensation of coating mist into drops in the free interior space of the hood and to collect the stray mist in the application chamber, together with the web treatment substance condensed from the mist onto the interior walls of the application chamber, so that none of the treatment substance in either fluid or large-drop condensate can reach the web. In cooperation with web 1, the hood 11 delineates three mutually communicating chambers P2, P3 and P4. The area on the opposite side of the web 1 relative to the coater apparatus is marked as space P1 that denotes the surroundings of the coater apparatus. The roles of these spaces will be discussed in more detail later in the text.

Chamber P2 is principally delineated by the web 1 and a flow guide baffle 12. Later in the text this space is called the application chamber. The top edge of the flow guide baffle 12 is provided with a pressurized-air duct 13, whose external wall 14 facing the web 1 is inclined so as to reach close to the web 1. A plurality of air jets are ejected from the pressurized-air duct 13. An air jet slot 18 is adapted to the portion of the duct closest to the web, whereby the air jet ejected therefrom is impinged directly on the web 1. This air jet is arranged to support the web 1 or to prevent the entry of air traveling along with the web into the application chamber P2. The ventilation air of the application chamber is provided by another air jet directed from nozzles 17 downward obliquely into the interior of the application chamber P2 and by another air jet directed parallel with the travel of the web 1 from nozzles 16 adapted to operate in the vicinity of the upper end of the flow guide baffle 12. The function of these air jets is to border the spray mist volume saturated by the sprays of the web treatment substance to stay below the linear array of spray nozzles so that the mist cannot escape via the gap remaining between the web 1 and the coater apparatus and that accumulation of the web treatment substance on structures above the linear array of spray nozzles is prevented. A further function of the air jets and, in particular, of the jets directed from nozzles 6, is to prevent detrimental turbulence that otherwise would be invoked in the interior of the application chamber P2 by the linear movement of the web. The pressurized-air duct 13 receives supplementary air via openings 15, whereby the inflow of the supplementary air also reduces the amount of air entering along with the web.

The top edge of the flow guide baffle 12 is located immediately below the pressurized-air duct and nozzles 16. In the embodiment of FIG. 1, on the flow guide baffle are made two horizontal rows of openings to provide through holes 19 for spray nozzles 21. At the through holes 19, the flow guide baffle 12 is bent backward behind the tip of nozzles 21 just above the nozzles 21, while the lower edge of the through hole below the nozzles 21 is aligned flush with the principal plane of the flow guide baffle 12. Typically, the bent portion of the baffle extends 5 to 10 mm behind the principal plane of the flow guide baffle. Just below the lowermost row of nozzle through holes, the flow guide baffle 12 is bent toward the web 1 so that the baffle ends at an inlet opening 23 of a suction channel 22. The suction channel 22 and the suction opening 23 extend over the entire cross-machine width of the coater apparatus. At the lower edge of the suction opening 23 is adapted to operate a gas knife 24 in which a flow of air is provided from a pressurized-air chamber 25 located therebelow.

To the opposite side of flow guide baffle 12 in regard to the web is placed a partition 26 behind which are located the nozzle array beams 27 housed in the spray nozzle beam chamber P4. Onto the nozzle array beams 27 are mounted the spray nozzles 21 having a length sufficient to extend trough openings 31 of partition 26 at least to the principal plane of the flow guide baffle 12, advantageously even past the plane of the flow guide baffle. In this embodiment, the coater apparatus comprises two superposed nozzle array beams 27, each having a linear nozzle array mounted thereon. Between the flow guide baffle 12 and the partition 26 is formed a suction chamber P3, wherein the pressure is kept below that of application chamber P2 and spray nozzle beam chamber P4. The upper portion of the suction chamber P3 is provided with one or more nozzles 28 for spraying a substance that removes accumulations possibly deposited in the suction chamber P3 and a suction duct 22 located in the lower portion thereof. This flushing substance may be, e.g., water, a suitable chemical or the web treatment substance, surface size or a mixture thereof. The choice of a suitable flushing substance is primarily dictated by the type of web treatment substance used in the process. For instance, when calcium carbonate-based coating finishes are used, the accumulations on the structures of the assembly are advantageously removed by means of a diluted acid, such as citric acid for instance. The acid disintegrates calcium carbonate into calcium and carbon dioxide. The suction chamber P3 also includes means 29, 30 for cooling those surfaces that are situated above the level of the spray nozzle arrays penetrating the flow guide baffle 12. Cooling may be implemented with the help of channels filled with a cooling liquid.

The coater apparatus forms in a close vicinity of web 1 a spray-coating zone delineated by the flow guide baffle 12, the moving web 1 and, on the ingoing side of the web, by the air jets ejected from the nozzles 18 and, on the outgoing side, by a gas jet knife 24. In the coater, the web 1 is subjected within the above-defined spraying zone to a spray-coating step applied from nozzles 21 that eject an atomized spray of a web treatment substance which may be, e.g., a coating furnish, surface size or other treatment substance such as a polymeric coating or even simply water used for wetting the web. A plurality of spray nozzles 21 are located to operate over the cross-machine width of the web and their spray patterns on the web may be discrete or partially overlapping. While the embodiment of FIG. 2 is drawn to have two linear arrays of nozzles operating in succession, it is obvious that the number of nozzle arrays may be varied as considered appropriate. The benefit of using two or more nozzle arrays is that they can be used alternatively when so required due to washing or servicing, for instance. The top region of the spray-coating zone is delineated by an air jet released from the pressurized-air duct via nozzles 18 so as to simultaneously support the web. From the same duct is also ejected air via nozzles 16, 17 in order to ventilate the spray-coating zone. The function of the air jets is to border the spray mist space filled by the sprays 20 of the web treatment substance to stay below the linear array of spray nozzles so that accumulation of the web treatment substance on structures above the upper linear array of spray nozzles is prevented. A further particular function of the air jets ejected from nozzles 16 is to prevent detrimental turbulence that otherwise would be invoked in the interior of the application chamber by the linear movement of web 1. If the substance being applied is allowed to condense, it can readily form dripping accumulations that, when falling into the spray of the web treatment substance, land on the web 1 thus causing defects in the applied coating.

The portions of the flow guide baffle 12 situated above the linear nozzle arrays are cooled down to a temperature below the dew point of the atmosphere prevailing in the application chamber. As a result, from the mist onto the cooled surfaces is condensed a film of the web treatment substance that flows downward along the surface of the flow guide baffle. The flowing film of fluid treatment substance traps the stray mist thus preventing the web treatment substance from drying or solidifying on the surface of the baffle. The top edges of the through holes 19 of nozzles 21 are bent inward toward suction chamber P3. Now, as the web treatment substance condensate flows downward along the surface of the flow guide baffle 12, the flow follows to the curved edge of the opening thus forcing the flow to proceed behind the tip of nozzle 21 protruding via the nozzle through hole 19, whereby the fluid condensate of the web treatment substance cannot fall into the spray of the web treatment substance. The pressure in the suction chamber P3 is maintained below that of application chamber P2 thus inducing a flow at the nozzle through holes 19 from application chamber P2 to suction chamber P3. The flow rate at this point must be sufficiently high to prevent the ejector effect of web treatment substance spray 20 from sucking the dripping condensate back into the application chamber and its application spray so as to allow it fall in detrimental drops onto the web 1. A sufficiently high flow rate can be secured by applying a reasonably high differential pressure between the chambers and securing a sufficiently high discharge flow rate of air from the suction chamber. In this fashion, the suction flow via the nozzle through holes directs both the condensate formed on the tip of the nozzle as well as the condensate flowing downward from above to be collected into suction chamber P3. As the pressure of suction chamber P3 is maintained lower than that of the spray nozzle beam chamber P4, stray mist of web treatment substance is prevented from entering the spray nozzle beam chamber P4 and the interior parts of the coater.

Excess mist of web treatment substance and the condensate thereof formed on the structures of the assembly are collected into a suction duct 22 adapted to the lower end of the assembly. Suction duct 22 is used for applying a vacuum to suction chamber P3 and for collecting away the fluid phase of the web treatment substance and the mist thereof entrained with the air sucked into the duct. The pressure in the suction duct must be kept so low in regard to the ambient pressure that the flows entering the duct 22 of a circular cross section are really vigorous. The vacuum system of the coater apparatus comprises a suction fan connected to the suction duct 22 so that the duct is evacuated from air by means of a suction fan. As the duct 22 is adapted to communicate via opening 32 with suction chamber P3, also this chamber is kept under a vacuum. Since the suction duct 22 is further adapted to communicate with application chamber P2 via a suction inlet opening 23, also the application chamber can be kept under a vacuum by means of the suction duct 22. The lower portion of flow guide baffle 12 is bent toward the moving web 1 thus locating the suction inlet opening 23 in a close vicinity of the web. The suction inlet opening 23 is shaped so that it directs the inlet flow tangentially with the interior wall of the suction duct 22 having a circular cross section. Also another inlet channel 32 entering into the suction chamber P3 is adapted substantially tangentially thereto, whereby its one side is formed by the rear wall of the flow guide baffle 12. The other wall of the inlet channel is formed by a flow channel wall 33. The flow channel wall together with the rear wall of the flow guide baffle 12 give the inlet channel a tapering cross section. As the flow rate into the suction duct 22 must be rather vigorous to achieve efficient collection of stray mist, a high-speed flow can thus be established in the tapering suction duct inlet channel and the inlet openings 23, 32 that is further augmented by the tapering cross section of the suction duct inlet. After these flows enter the suction duct in a tangential fashion, a strong vortex is generated in the interior of the suction channel, whereby the liquid phase of the flow splashes against the walls of the suction duct thus separating a portion of the entrained web treatment substance from air already in this phase. Simultaneously the web treatment substance wets the entire interior wall of the duct thereby preventing the drying of the web treatment substance in the duct.

A highly characterizing feature of the present invention is the division of the coater apparatus construction into at least two, advantageously three chambers P2, P3 and P4 that are isolated from the ambient pressure of the surrounding space P1. The pressure of application chamber P2 must be kept lower than the pressure of the surrounding space P1 and higher than pressure of suction chamber P3 in order to prevent the web treatment substance from escaping to the surroundings and thereby to collect stray mist and condensed fluids accumulated in the application chamber. Advantageously, the pressure in the spray nozzle beam chamber P4 is kept above that of the suction chamber P3 to prevent stray mist of the web treatment substance from entering into the interior space the coater apparatus. However, instead of maintaining a vacuum in this chamber it is also possible to pressurize the chamber or, alternatively, to provide the through holes 31 of the spray nozzles 21 with tight seals. The vacuum required in the suction duct 22 and the suction chamber P3 is dependent, among other factors, on the size of the coater system, whereby these spaces in an operative system are typically taken to a vacuum of 50 to 6000 Pa below the ambient pressure. It must be understood that the actual level of vacuum is not decisive provided that the flow velocity and differential pressure are sufficient to establish a reasonably high flow rate.

Inherently, paper web 1 tends to catch the mist of web treatment substance together with air along with its travel. This aerosol may not be allowed to escape from application chamber P2. In the assembly of FIG. 2, the outgoing side of web 1 is sealed by a gas-jet knife 24 which is located at the outgoing end of the coater and is adapted to communicate with the pressurized-air chamber 25. The gas, generally air; blown out from the slit nozzle of the gas jet knife 24 effectively prevents the aerosol mist from escaping to the surroundings. A blower or compressor may be used for establishing the required pressure in the pressurized-air chamber 25 so that the pressure level therein is typically 100 to 6000 Pa above the ambient pressure. To above the gas jet knife 24 is placed a flow guide 34 that divides into two channels the suction inlet opening 23 of suction inlet 22 as far as its reaches into the application chamber P2.

The function of the flow guide 34 is to prevent the downward falling web treatment substance drops and mist from reaching the gas jet knife, particularly along with the flow passing via the gap between gas jet knife 24 and flow guide 34. If accumulation of liquid material on the top surface of the gas jet knife 24 should occur, the rapid air flow discharged from the narrow slit of the gas jet knife, which typically is 0.1 to 2 mm wide, would splash the liquid as detrimental drops onto the web 1. Advantageously, the flow guide 34 is cooled down to a temperature below the dew point in this space so that no residues of the web treatment substance can remain drying on the surfaces of the flow guide. Advantageously, cooling is implemented, e.g., by making the flow guide 34 hollow and then providing a cooling liquid channel therein.

Figure 3:
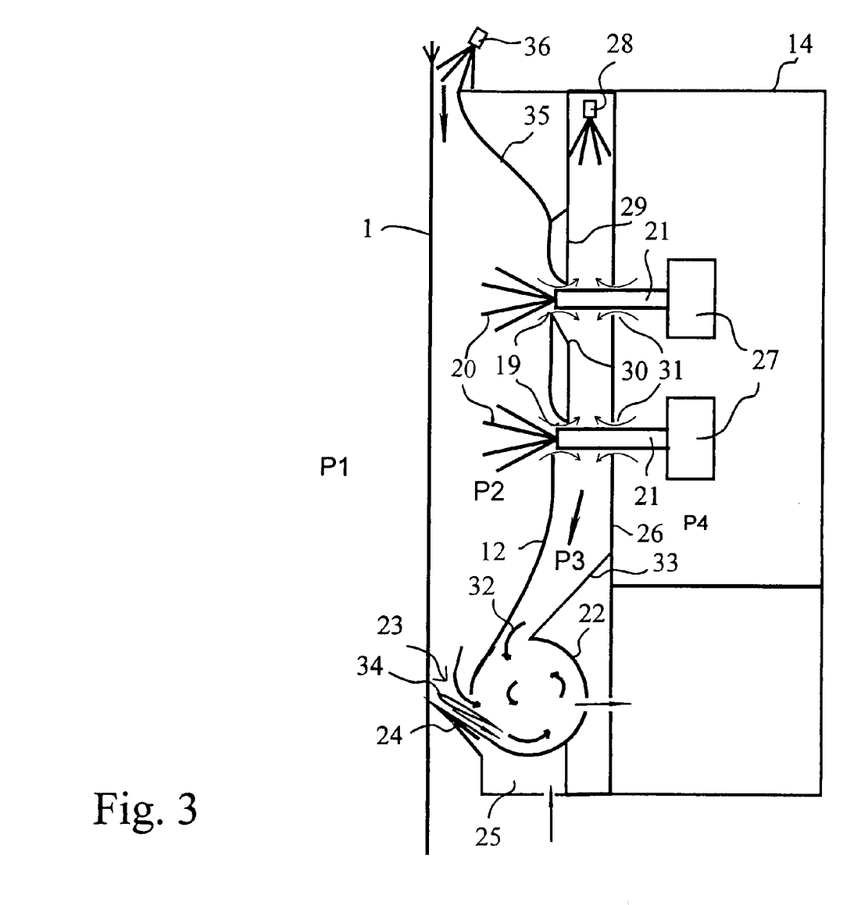
FIG. 3 shows a second embodiment of the invention.

In the embodiment of FIG. 3, the air jets at the upper portion of the application zone have been made unnecessary by a suitable contouring of the flow guide baffle 35. Herein, the flow guide baffle 35 is located close to the web at the ingoing end of the web 1 and is then contoured to bend away from web 1 so as to form the application chamber. By virtue of such contouring, the air boundary layer traveling along with the entering web causes a strong air flow in the gap between web 1 and flow guide baffle 35. This vigorous air flow prevents the mist of web treatment substance from escaping to the surroundings from the application chamber via the ingoing side of the web 1. Next, the backward-bent shape of the flow guide baffle 35 allows the cross section of the entering air flow to increase rapidly, whereby the pressure and flow velocity of the air flow fall. Resultingly, the turbulence of the entering air dies off and the flow cannot reach at full power the sprays 20 of the web treatment substance.

In a close vicinity of the gap remaining between the web 1 and the ingoing-side edge of the flow guide baffle 35 is/are adapted a nozzle or nozzles 36 for blowing moist air or steam into entry gap of the web in order to moisten the air entering the application chamber and to improve condensation on the cooled surfaces of the chamber. In FIG. 3, the cooled area 29 above the uppermost linear nozzle array is shown extending only slightly above the nozzle array in the same fashion as in the embodiment of FIG. 2. However, the cooled area may be extended further, even up to the ingoing-side edge of the flow guide baffle 35. As to its other details, the assembly described above is similar to that shown in FIG. 2.

Figure 4:
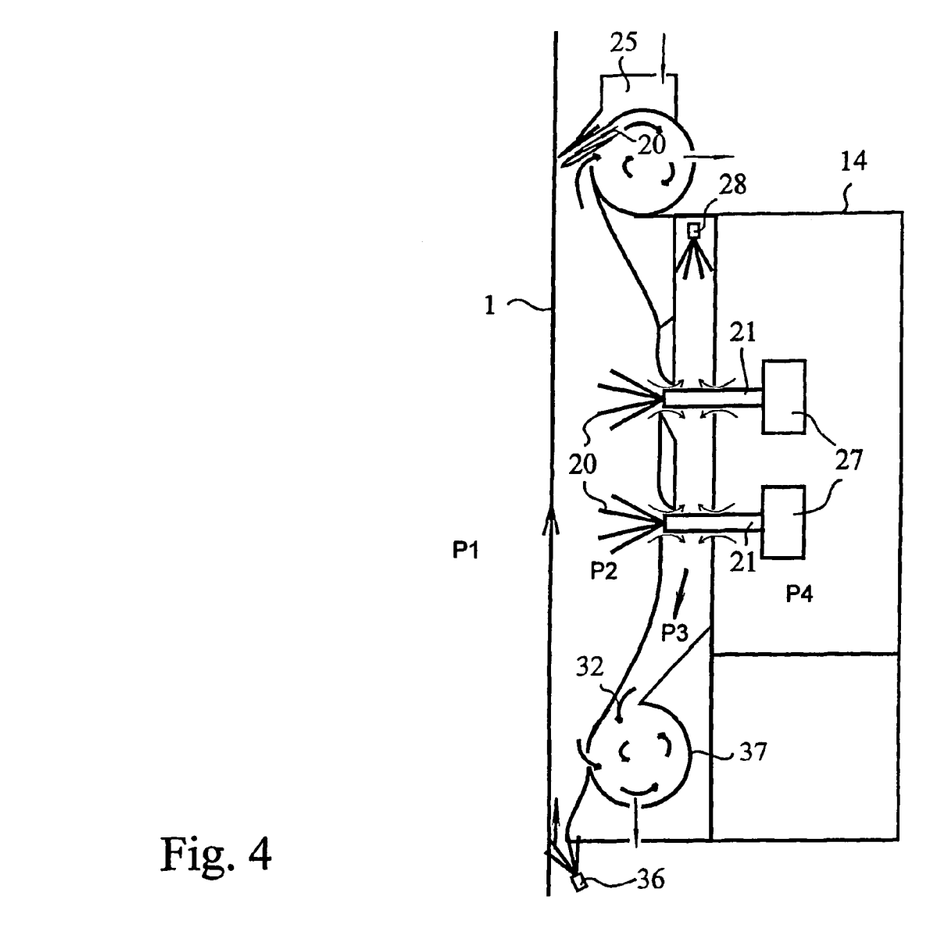
FIG. 4 shows the assembly of FIG. 3 in its inverted operating position.

In FIG. 4 is shown an embodiment suited for treating a web running vertically upwards. Herein, the suction duct 22 is located at the upper part of the assembly, but otherwise the basic construction and function of the coater apparatus are identical to those described in the foregoing. However, the web ingoing side of the coater apparatus must be provided with a second suction duct 37 for collecting liquid accumulations and drippings. In this embodiment, the suction duct at the outgoing side of the assembly opens only toward the application chamber P2, whereby the duct serves for collecting stray mist alone. The vacuum of suction chamber P3 is applied via the ingoing-side of suction duct 37.

Figure 5:
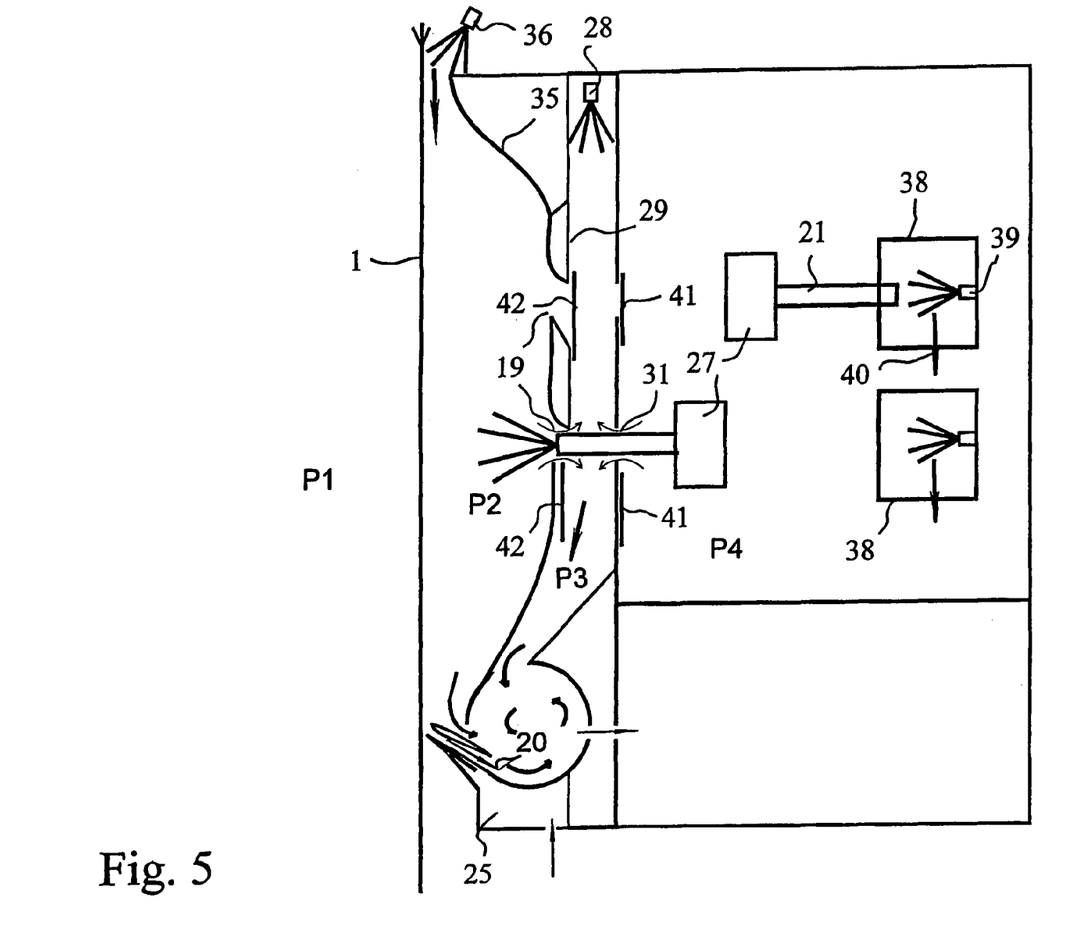
FIG. 5 shows the assembly of FIG. 3 and a first embodiment of a washing system adapted to cooperate therewith.

In FIG. 5 is shown a washing arrangement for cleaning the nozzles. For washing, the spray nozzle beam chamber P4 is provided for each one of the linear nozzle arrays with separate washing chambers 38 into which the ends of the nozzles 21 can be inserted. The washing chambers 38 incorporate washing nozzles 39 for spraying a washing liquid against the end of the nozzle 21 and a drainage line 40 for removal of spent washing liquid. By applying a high-pressure jet of washing liquid against the tip of the web treatment substance spray nozzle 21, it is possible to open even a plugged nozzle orifice, whereby the washing liquid penetrating into the nozzle body via its orifice causes therein a vortex that can also dislodge crusts and accumulations in the interior of the nozzle body. Either one of the nozzle array beams 27 has its own washing chamber 38 wherein the entire nozzle array is washed in a single step. The washing nozzle 39 may be arranged to move in parallel with the nozzle array and treat one nozzle at a time or, alternatively, a separate washing nozzle may be provided for each one of the web treatment substance nozzles of the array. The through holes 19 of the flow guide baffle 12 and the openings 31 of the partition are equipped with blind flaps 41, 42 that prevent any flow through the openings when the nozzle array beam 27 and the spray nozzles 21 are taken into their washing position.

Figure 6:
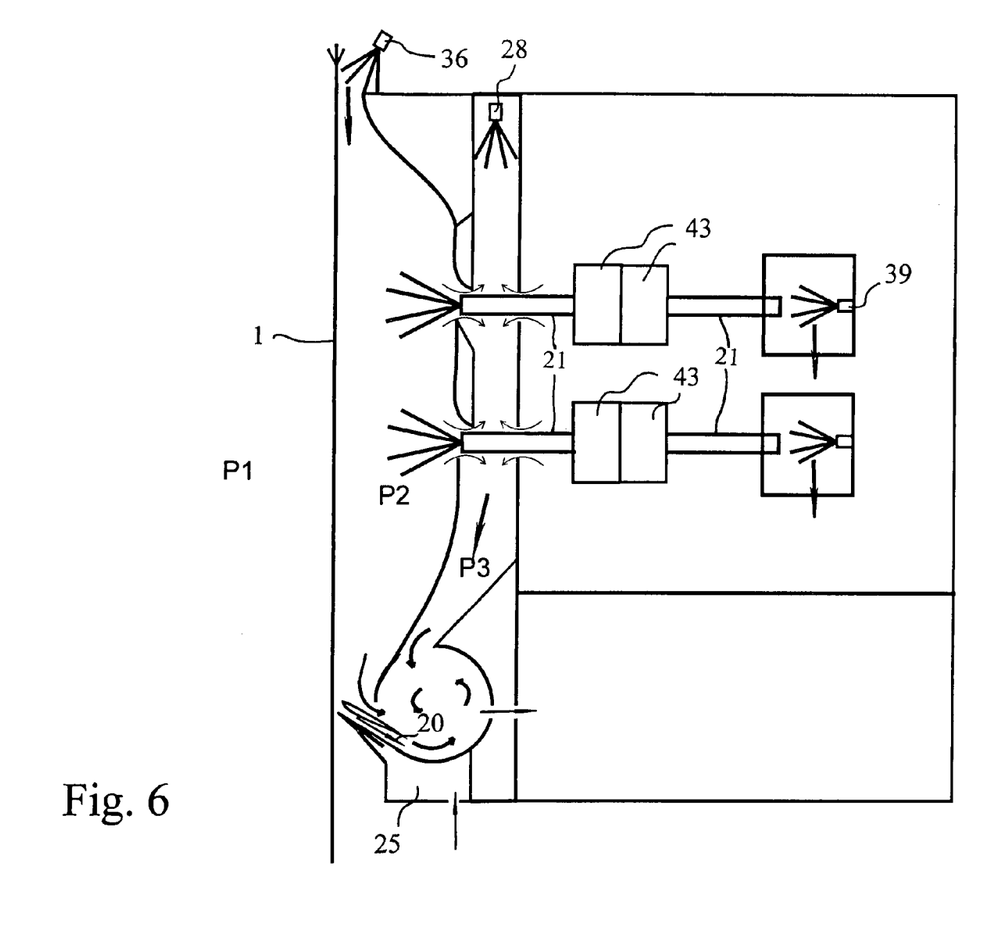
FIG. 6 shows the assembly of FIG. 3 and a second embodiment of a washing system adapted to cooperate therewith.
Figure 7:
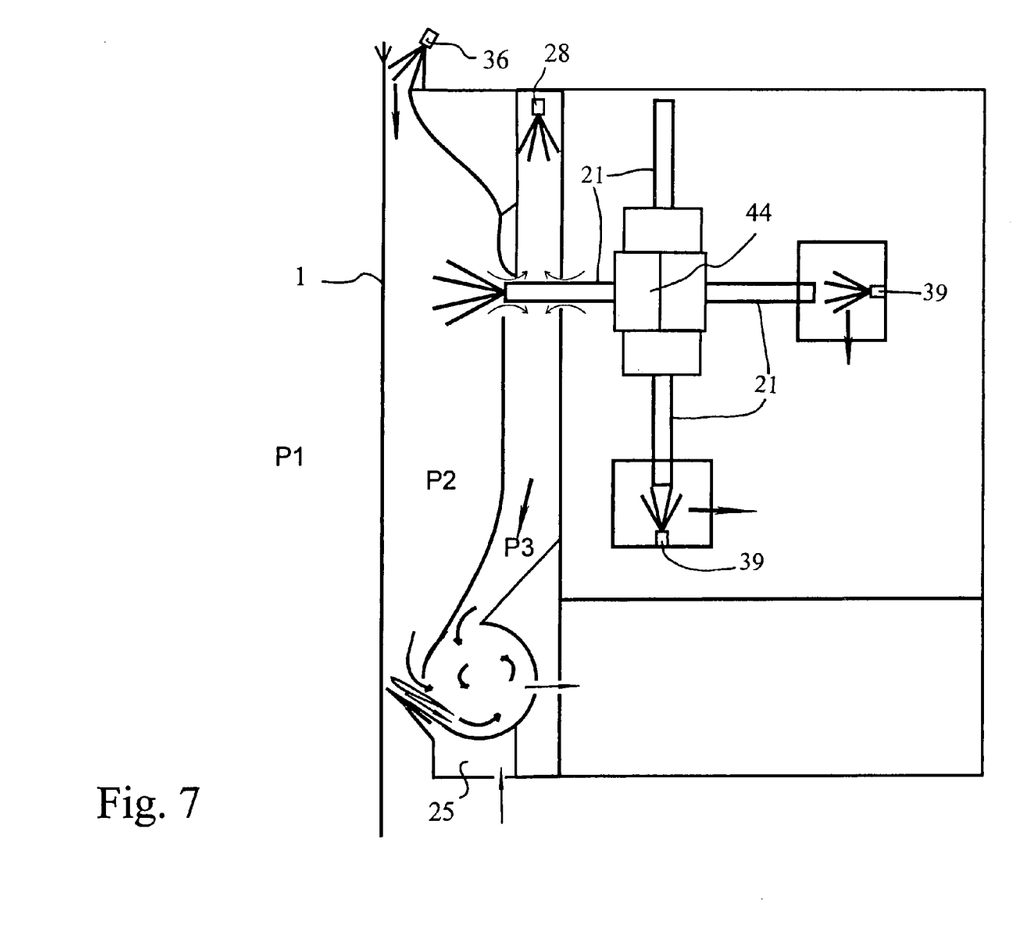
FIG. 7 shows the assembly of FIG. 3 and a third embodiment of a washing system adapted to cooperate therewith.

The embodiment of FIG. 6 is implemented using a dual-sided nozzle array beam 43, wherein the spray nozzles 21 for spraying the web treatment substance are aligned in opposite directions. The arrangement makes it possible to run the apparatus in a continuous fashion even during washing. The embodiment of FIG. 7 uses a four-beam system 44 of spray nozzles. The nozzle beam assembly shown therein comprises four nozzle arrays of which one is always in the application position, two in the washing position and one in the service position, wherein repair operations such as nozzle replacement, for instance, can be carried out. This embodiment allows fast change-over of nozzle arrays into a different position and eliminates interruptions due to washing or service operations performed on a nozzle array. The construction also permits the use of different sizes of nozzles in the different nozzle arrays thus facilitating rapid change-over of paper grade in production.

In addition to those described above, the invention may have alternative embodiments.

In the exemplary embodiments described in the foregoing, the web 1 is adapted to run vertically upward or downward. However, different web run directions may be contemplated and, in fact, the coater apparatus can be adapted in any position provided that the web is at all times arranged to run above the coater, either vertically or in any slanted position. In systems used for simultaneous two-sided application, the web must be arranged to run in a vertical direction. By having the web running above or directly at the side of the coater apparatus, the condensate of the web treatment substance is prevented from landing on the web. Also the number of nozzle arrays and nozzle array beams may be varied from those of the exemplary embodiments. Accordingly, a single nozzle beam assembly may comprise, e.g., three linear nozzle arrays and the number of linear nozzle arrays in a coater apparatus can be made as large as permitted by the available space. The nozzles are advantageously manipulated as contiguous linear array assemblies, whereby their transfer between the washing, servicing and operative positions and handling in these positions is most uncomplicated. Obviously, individual handling of nozzles could be contemplated, but this alternative readily complicates the construction of the apparatus. While simultaneous two-sided application can be performed having the nozzle arrays with their individual nozzles exactly aligned with those on the opposite side of the web, it has been found that the web run is generally easier to control if the opposed nozzle arrays and possibly even their individual nozzles are staggered in regard to each other. In the exemplary embodiments described above, a falling film is formed on the flow guide baffle from the condensing mist. If certain web treatment substances or given operating conditions do not generate a sufficient amount of mist for forming a condensate, the falling film can be established by means of nozzles or a narrow slit adapted to operate at the upper edge of the flow guide baffle. Obviously, the falling film may be generated from some other substance than the web treatment substance currently being used. While the cross section of the suction duct may be different from a circular shape, the air flow vortex is easiest to induce in a duct of circular cross section and, furthermore, this kind of duct has no corners where dry web treatment substance could accumulate. The upper lip of the gas jet knife that seals the application chamber at the outgoing side of the web can be shaped to reach toward the web, finally bending parallel with the web, whereby the air flow induced by the gas jet knife follows the curved shape up to the tip of the gas jet knife thus keeping the gas jet knife free from soiling.

What is claimed is:

1. An apparatus for treating a moving web of paper or paperboard with a web treatment substance, comprising:
an applicator comprising:
an application chamber located proximate and facing a moving web, the chamber being delineated by the web, a plurality of walls and a sealing means at ingoing and outgoing sides of the web into the application chamber; and
at least one linear nozzle array having at least one spray nozzle operable to spray a web treatment substance onto a surface of the web when a portion of the web is within the application chamber;
a suction chamber communicating with the application chamber through an inlet opening positioned at a lower edge of one of the walls delineating the application chamber; and
a suctioning means communicating with the suction chamber and the application chamber and being operable to remove mist and accumulation of the web treatment substance in the application chamber by establishing a flow in the suction chamber and the application chamber by establishing a pressure in the application chamber lower than ambient pressure in space surrounding the apparatus, and the pressure in the suction chamber lower than the pressure in the application chamber, so that a free flow direction of substances is from the space surrounding the apparatus into the application chamber, from the application chamber into the suction chamber, and from the suction chamber into the suctioning means, so that web treatment substance sprayed onto the surface of the web but not adhered to the web and formed condensate within the apparatus is removable by the suctioning means.

2. The apparatus of claim 1, wherein said suctioning means comprises a suction duct communicating with said suction chamber and a suction fan communicating with the suction duct.

3. The apparatus of claim 2, wherein the suction duct has a circular cross-section, and is connected to the suction chamber and the application chamber via openings aligned at least partially tangentially relative to said circular cross-section in order to induce a vortex in the suction duct.

4. The apparatus of claim 1, further comprising a spray nozzle beam chamber communicating with the suction chamber and pressurized so that the pressure in the spray nozzle beam chamber is higher than the pressure of the suction chamber.

5. The apparatus of claim 4, further comprising at least one spray nozzle beam assembly having at least two linear nozzle arrays adapted thereon.

6. The apparatus of claim 4, further comprising at least one nozzle array beam within the spray nozzle beam chamber and having the at least one nozzle of said at least one linear nozzle array mounted thereon, the at least one nozzle array beam being mounted so that the beam can be rotated into at least an operative position and at least one other position.

7. The apparatus of claim 6, further comprising:
at least one washing chamber located within the spray nozzle beam chamber, and being sized to house the at least one spray nozzle; and
at least one washing nozzle operable to spray a washing substance onto a tip of the at least one spray nozzle.

8. The apparatus of claim 1, wherein the application chamber is partially delineated by a flow guide baffle having at least one through-hole positioned to accomodate the at least one spray nozzle, at least upper portions of said at least one through-hole being bent so as to extend from the application chamber to the suction chamber.

9. The apparatus of claim 8, wherein at least a portion of the flow guide baffle positioned above at least one spray nozzle comprises a cooling means for cooling the flow guide baffle.

10. The apparatus of claim 9, further comprising a gas jet knife positioned downstream from an opening a suction duct in a travel direction of the web; the gas jet knife being operable to seal the application chamber.

11. The apparatus of claim 10, further comprising an air flow guide positioned to prevent soiling of the gas jet knife.

12. The apparatus of claim 11, wherein the air flow guide is positioned at an opening of the suction duct communicating with the application chamber or at an upper lip of the gas jet knife.

13. The apparatus of claim 1, wherein the web runs horizontally through the application chamber.

14. The apparatus of claim 1, wherein the web runs vertically through the application chamber.

15. The apparatus of claim 1, further comprising two applicators, one applicator being positioned to spray the web treatment substance onto one surface of the web, and the other applicator being positioned to spray the web treatment substance onto the other surface of the web.

16. The apparatus of claim 15, wherein the spray nozzles of at least one linear array are aligned so as to operate opposite to each other.

17. The apparatus of claim 15, wherein the spray nozzles of the at least one linear array are staggered in order to stabilize a run of the web.

18. The apparatus of claim 1, further comprising at least one nozzel operable to blow moist gas or steam into the application chamber.

19. The assembly of claim 1, further comprising at least one nozzel operable to spray a washing substance into the suction chamber.

* * * * *